United States Patent [19]

Friedrich et al.

[11] Patent Number: 5,711,880
[45] Date of Patent: Jan. 27, 1998

[54] FILTERING MEANS FOR THE FILTRATION OF EXTRACTION BEVERAGES, IN PARTICULAR ESPRESSO

[75] Inventors: Dieter Friedrich, Vockenhausen; Gunther Seidel, Frankfurt am Main; Michael Machlitt, Schwalbach; Rolf Eimecke, Obertshausen; Dieter Koch, Pattensen; Christof Miltenberger, Schmitten; Robert Wirsing, Dreieich, all of Germany

[73] Assignee: Braun Aktiengesellschaft, Frankfurt, Germany

[21] Appl. No.: 701,750

[22] Filed: Aug. 22, 1996

[30] Foreign Application Priority Data

Sep. 2, 1995 [DE] Germany ............... 195 32 481.1

[51] Int. Cl.⁶ .................................................. B01D 39/14
[52] U.S. Cl. ................... 210/498; 99/295; 426/77; 426/84
[58] Field of Search ............... 426/77, 84; 210/498; 55/527; 99/295, 305

[56] References Cited

U.S. PATENT DOCUMENTS 4,443,233  4/1984  Moran .............................. 55/525
4,801,379  1/1989  Ehrsam et al. ................. 210/498
5,008,013  4/1991  Favre et al. ................... 210/498
5,190,653  3/1993  Herrick et al. ................ 426/77
5,292,437  3/1994  Ford ............................. 210/498
5,384,044  1/1995  Burgess ......................... 210/498

FOREIGN PATENT DOCUMENTS 0 309 708 B1  4/1989  European Pat. Off. .
0 515 245 A1  11/1992  European Pat. Off. .
23 59 347 A1  6/1975  Germany .
41 35 660 A1  5/1992  Germany .

*Primary Examiner*—W. L. Walker
*Attorney, Agent, or Firm*—Fish & Richardson P.C.

[57] ABSTRACT

A filter for the filtration of extraction beverages includes a disk having a plurality of apertures through which the beverage extracted from the material to be extracted passes form the afflux side to the efflux side. Each aperture is formed by cut edges in the disk and by bending a cut edge away from the surface of the disk to form a roof-shaped dome. The filter is formed by a single punching, bending and embossing operation without scrap slug being produced.

29 Claims, 4 Drawing Sheets

FILTERING MEANS FOR THE FILTRATION OF EXTRACTION BEVERAGES, IN PARTICULAR ESPRESSO

This invention relates to a filtering means for the filtration of extraction beverages, in particular espresso, comprising a disk structure provided with a plurality of apertures through which the beverage extracted from the material to be extracted passes from the afflux side to the efflux side.

Filtering means of the type referred to are known from DE-A1-23 59 347, DE-A1-41 35 660, and EP-B1-0 309 708. The known filtering means are comprised of a piece of sheet metal having a plurality of uniformly distributed apertures of essentially equal size. The area of cross-section of the apertures may be round, square, or also rectangular, their respective configurations being such that their central axis extends normal to the sheet metal surface, and their cross-section increases in the direction of flow. The processes employed to produce the known apertures are electroforming, laser beam machining, or photoetching. These processes, however, involve considerable expense and time.

Moreover, in the manufacture of espresso filters it is known to deform a piece of sheet metal by means of a press such as to produce protuberances on one side and depressions on the other side. In a subsequent operation, the protuberances are abraded by grinding until the depressions beneath the protuberances form apertures. By means of further forming operations, an imperforate area of the sheet metal may be formed into a cup. A significant disadvantage of this method resides in the wide spread of the aperture diameters. When the protuberances are abraded down, the resulting burr partially recloses the holes, making it nearly impossible to obtain defined cross-sections of aperture.

Still further, a filtering means of the type initially referred to is known from EP-A-0 515 245. In this filtering means, several cut edges are bent up away from a disk structure, forming elastic tongues which, being exposed to elastic deformation, open the apertures to a greater or lesser extent, depending on the pressure on the afflux side. Because the apertures vary in dependence upon this pressure, the desired high pressure drop at the apertures, which would be necessary to produce a large amount of crema, is prevented from occurring.

It is therefore an object of the present invention to provide a filtering means of the type initially referred to by means of which the crema of the filtrate, in particular of an espresso beverage, is materially improved. At the same, it is desirable that the filtering means be manufacturable with particular ease and economy.

The manufacture of the filtering means of the present invention is straightforward. As starting material, a disk structure is used, preferably of stainless metal, and it is noted that in the use of metal the bending up of cut edges and the roof-shaped domes joined to the sides of the cut edges result in apertures whose cross-sections are of high accuracy without being subject to variations when exposed to pressure from the afflux side in operation of a beverage brewing apparatus. This is accomplished in particular by joining the side portions of the dome to the disk structure. In comparison to conventional filtering means, the thickness of the disk structure is substantially irrelevant, that is, also thicker disk structures can be manufactured with accurately predetermined apertures according to the invention. In the filtering means of the prior art, this can be accomplished with difficulty only, because these employ processes that predominantly operate to perfection with very thin disks only.

The filtering means of the present invention affords ease and economy of manufacture, requiring only a single operation to produce on a filtering means a plurality of apertures with a plurality of domes.

In the filtering means of the present invention, the apertures are provided on the filtering means in such a manner that the jets of brew exiting from the apertures are broken up multiple times, resulting in an added mixing effect producing a very fine-pored and long-lasting foam referred to as "crema" as found desirable in particular on an espresso or a comparable coffee beverage. By lance-cutting and bending up the cut edges, there result due to the cutting geometry apertures of an approximately oval or triangular cross-section having sharp edges and tapering in particular towards the edges so that when a brewed beverage is forced through, a particularly abrupt pressure drop occurs at these locations which is conducive to the formation of crema.

A particularly advantageous bending operation can be performed on the cut edges by providing one aperture each at the opposite ends of a single dome. This facilitates cleaning of the passageways in addition to affording greater ease of manufacture of the filtering means.

Apart from the formation of good crema obtained by the apertures of the present invention, an improved mixing effect can be accomplished by arranging the individual apertures in a specific pattern.

Still further, by providing on the efflux side of the disk structure, between relatively associated apertures, a spray generating chamber that is bounded by the dome and the cut edges, it has proven to be advantageous that the jets of the filtrate first converge and then diverge and reflect off of the walls of the spray generating chamber. This swirling action, too, improves the formation of crema.

Bending the cut edges up away from the surface of the disk structure may be in either the direction of afflux or efflux of the filtering means. Domes are not provided on the efflux side of the filtering means, thus enabling the disk structure, when used as a disk, to be seated on a supporting structure as, for example, a filter basket holder. It has proven to be particularly successful in practice to provide the domes on the afflux side. The efflux side facing away from the brewing chamber outwardly is then of an essentially smooth and plane configuration. In this arrangement, the spray generating chambers are not closed by the espresso grounds because the domes cover the spray generating chambers from the side of the espresso grounds. This improves the formation of crema.

In a reversal of this arrangement in which the domes extend outwardly and the spray generating chambers extend towards the afflux side, that is, to the brewing chamber adapted to be filled with espresso grounds, the spray generating chamber is no longer able to fully meet its demands, being at least partially closed by the espresso grounds. Nevertheless, the crema obtained with this arrangement is very good because the apertures are very narrow in cross-section.

According to features of the invention, the line of cut of the apertures may be a straight line or a curved line. This results in simple cutting profiles enabling the cut edges of the areas lying within the straight or slightly curved lines to be bent up in a simple manner to produce the domes.

By arranging two adjacent apertures on a common circle, the filtering means can be manufactured with particular ease by using round punch steels for producing the apertures and for forming the domes. It will be understood, of course, that it is also possible to arrange several cut edges on a common circle, their domes then extending centrally in the center of this circle.

Using a diameter of between 1 and 3 mm, preferably 1.6 mm, filtering means have resulted which function particularly well, which retain the espresso grounds well while yet allowing the passage of the espresso beverage while crema is being formed.

The bend radii of the domes lie on the same diameter as the cut edges of the apertures. To produce the domes and the apertures, this enables round punch steels to be used which are particularly easy to manufacture. At the same time, the filter holes extend over the surface of the filtering means in a uniform pattern, producing an even flow of the brew as it leaves the filtering means.

According to another aspect of the invention a particularly good crema results. Where a forming punch is selected for the apertures and the domes, a tolerance specification of 0.03 mm can be maintained easily, because the form of the punches practically does not vary, and also because present-day machines allow the entrance depth of the punch steels to be maintained within precisely accurate limits. The substantially triangular shape of the apertures has proven to be particularly successful because it is the easiest to manufacture, and it can be checked for dimensional stability with equal ease. However, providing the apertures with other geometries of cross-sections may also be contemplated. Considering that the pressure in the brewing chamber should be approximately equal for a two-cup and a four-cup filter element to obtain consistently good crema results, it is necessary for the cross-sections of passage in the four-cup filter element to be correspondingly smaller, that is, in the presence of 400 apertures only a height of about 0.18 mm, as compared with 0.21 mm in a two-cup filter element.

The triangles are in the form of rectangular triangles in which the right angle is advantageously at the tip of the roof-shaped dome.

According to another aspect of the invention manufacturing is facilitated. These features, too, result in a clear hole pattern providing uniform rows to ensure an even flow of the brew as it passes through the filtering means. In this arrangement, a relative distance of the domes of between 2 and 3 mm, approximately, has proven to be successful.

Two apertures may be provided at the end of each dome. As a result of the straight-line extent of the crown area of the domes, the load on the dies in the manufacture of the apertures is kept low, because pointed elevations wear the dies faster.

By arranging the domes such as to extend vertically and horizontally to each other in alternating sequence, the beverage is allowed to be drained through the apertures more evenly.

According to the present invention, the lance cuts are made in a single punching process because it is precisely by such a process that the insides of the cut edges are exposed to a tearing action such as to produce extremely sharp edges around the apertures. At the same time, the domes are formed, because it is precisely thereby that it is possible to punch apertures in a minimum of space by means of the substantially triangular geometry, while the areas lying at a lower elevation are still in sufficient contact with the bottom part of the disk structure.

For the production of the domes and the apertures, it is a further advantage that cylindrical punching and embossing steels with chamfered surfaces are used. This results in a simple and low-cost manufacture of the cutting die. It is also possible for the steels to be configured such that two apertures adjacent to a dome are cut, that is, punched, bent, and at the same time cold-formed using the same steel, with their lines of cut lying on a common circle.

The present invention will be described in further detail in the following with reference to two embodiments illustrated in the accompanying drawings. In the drawings, FIG. 1 is a cross-sectional view, on an enlarged scale, of a dome with two apertures of a filtering means of the present invention, taken along the line I—I of FIG. 3;

To avoid repetitions, like parts have been assigned like reference numerals throughout the FIGS. 1 to 7.

Figure 1:
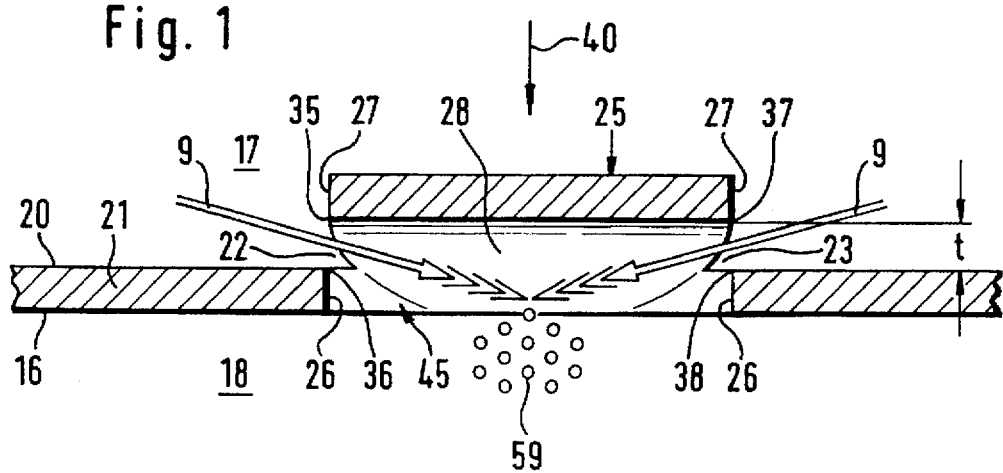
Figure 2:
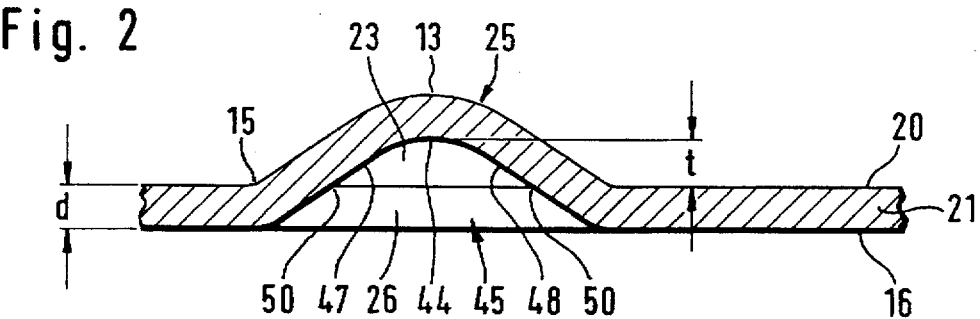
FIG. 2 is a cross-sectional view of a dome, taken along the line II—II of FIG. 3.

The filtering means 1 shown in FIGS. 1 to 7 is comprised of a disk structure 21 in the form of a plane disk cut out from strip stock or a piece of high-quality steel. The plane disk structure 21 includes a plurality of identical apertures 22, 23. According to FIGS. 1 to 7, the apertures 22, 23 are slots of triangular cross-section produced by lance-cutting or tearing cut edges 26, 27 and by bending up to form domes 25. The apertures 22, 23 are on the afflux side 17 of the disk structure 21 and have their highest area 13 in their center from where they taper to a point at the ends 50.

Using a disk structure 21 with approximately 200 apertures 22, 23 (one- to two-cup filter element), an optimum height t of 0.21 mm ±0.03 mm, as measured from the surface 20 to the lower edge 44 of the crown area of the dome 25 of the apertures 22, 23 has proven to be particularly suitable for the preparation of espresso. As becomes apparent from FIGS. 2 and 7, the area of cross-section of the apertures 22, 23 is triangular, with the angle a formed between the bent up sides 47, 48 of the dome 25 being 90°. The height t and the angle a determine the size of the triangular apertures 22, 23.

Figure 5:
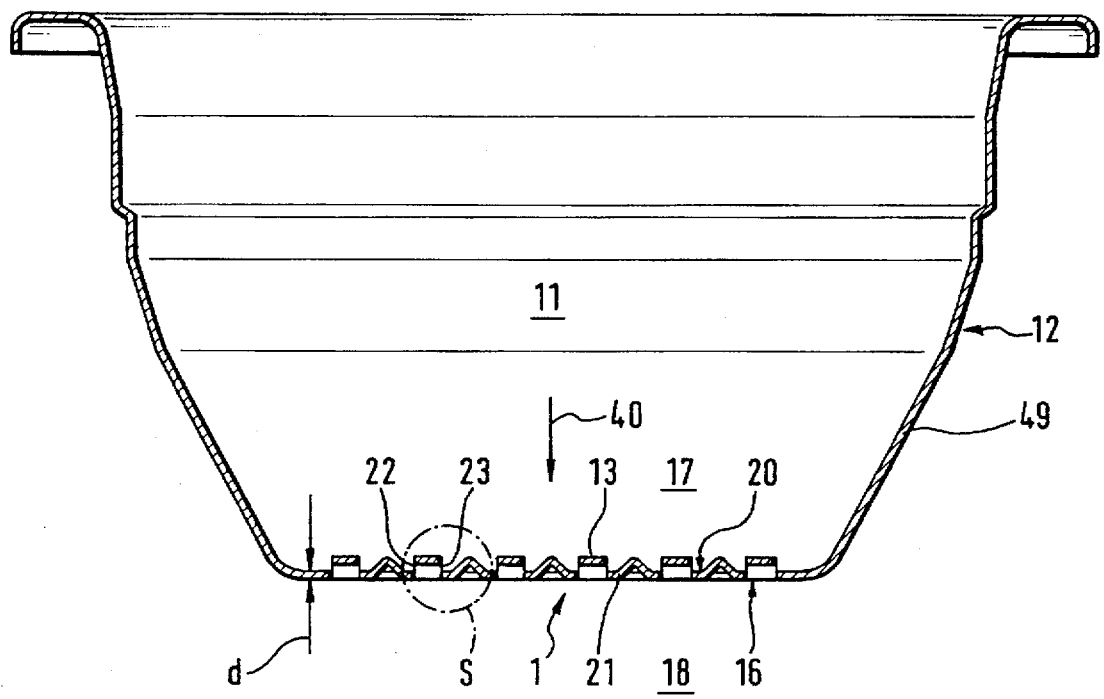
FIG. 5 is a sectional view, on an enlarged scale, of a second embodiment of the present invention, showing a filtering means provided in a bottom of a filter basket or cup.

The dome 25 extends parallel and concentrically with the horizontal 43 and is of a roof-shaped configuration, descending on either side. The dome raises from the surface 20 upwardly towards the afflux side 17, as is clearly shown in FIGS. 1 and 5. The cut edges 26, 27 are cut in such a manner as to extend vertically in a superimposed fashion; at the surfaces bounding the apertures 22, 23, they form cut edges 35, 36 and, respectively, 37, 38. Except for the circular depressions 45, the downwardly facing surface 16 of the disk structure 21 is otherwise of a plane configuration. The thickness d of the disk structure 21 or of the cup 12 (FIG. 5) is 0.5 mm, approximately. Because the cup 12 is deep-drawn, the thickness d of the disk structure 21 may vary relative to the cup-shaped area 49. In FIG. 5, for example, the disk structure 21 is formed integral with an upwardly adjoining cup 12 serving to receive coffee grounds (not shown).

Figure 3:
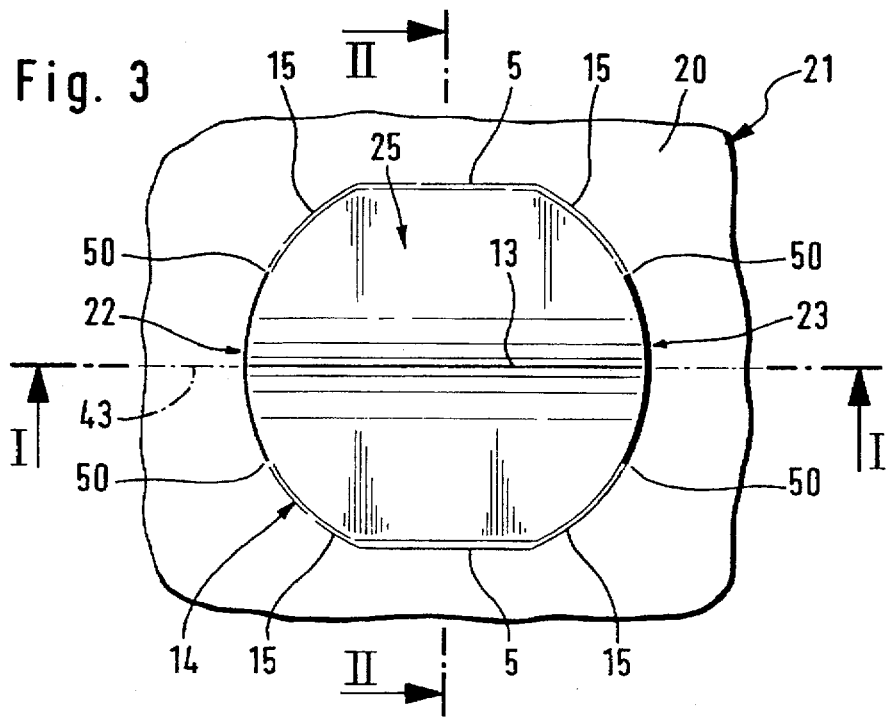
FIG. 3 is a top plan view of a fragment of a filtering means showing only one dome on an enlarged scale.
Figure 6:
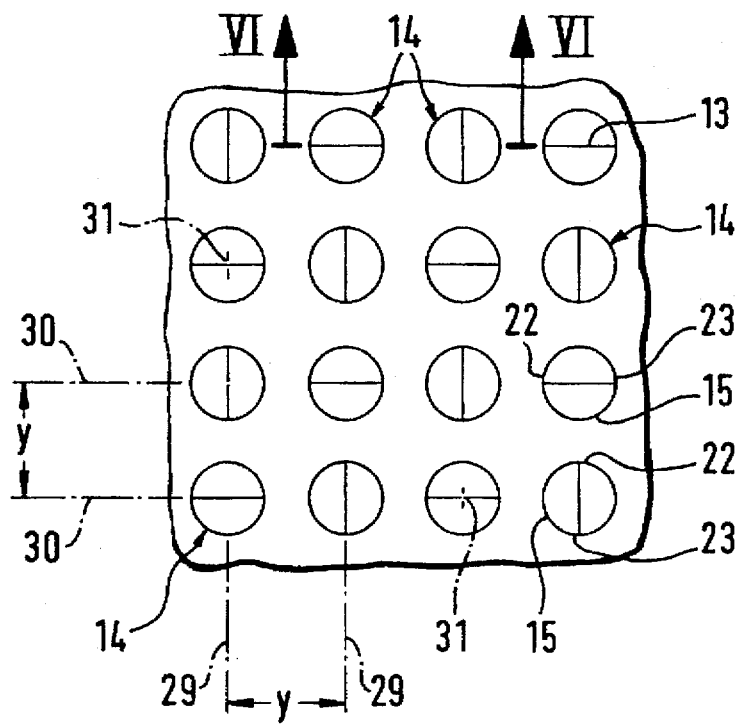
FIG. 6 is a top plan view of the filtering means in the area S of FIG. 5, shown on a still larger scale than in FIG. 5.

As becomes further apparent from the Figures, the area bent up to form the dome 25 provides at the transition to the plane disk structure 21 a bending edge 15 which in FIG. 3 is circular with flatted portions 5 on two sides, and which in FIG. 6 lies completely on a circle 14o According to FIGS. 3 and 6, the circular sections or circles 15 are interrupted by the apertures 22, 23 which in FIG. 1 are indicated by the thickly drawn area. The length of these areas is derived from the triangle data for the cross-section of the apertures 22, 23°.

Figure 7:
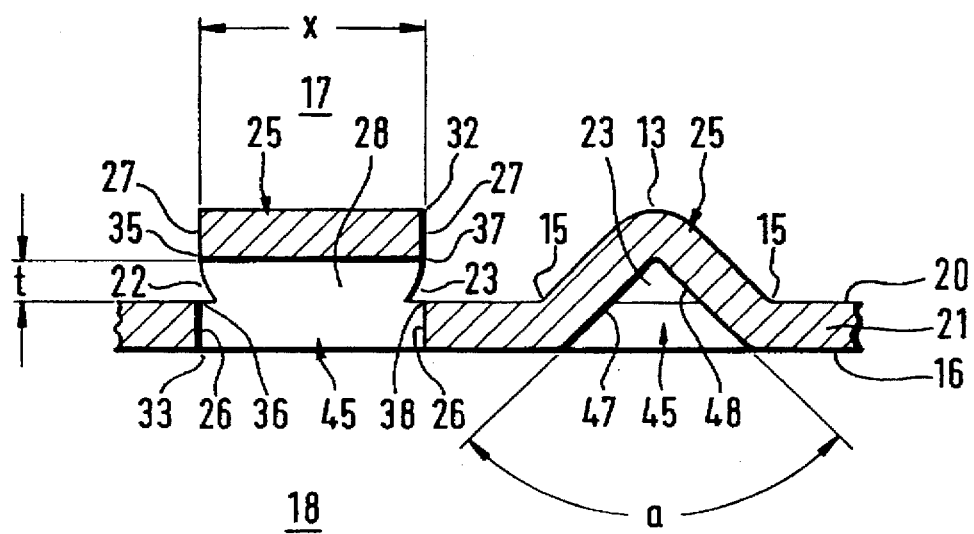
FIG. 7 is a partial sectional view of two domes taken along the line VI—VI of FIG. 6, again on a larger scale than in FIG. 6.

In FIGS. 1 and 7, a spray generating chamber 28 having its sides bounded by the cut edges 26 is provided beneath the dome 25. In this spray generating chamber 28, the espresso beverage admitted through the apertures 22, 23 as indicated by the jets 9 shown as arrows in FIG. 1 is mixed in that the jets 9 impinge upon each other. In this arrangement, the apertures 22, 23 are configured such that the very thin jets 9 strike each other in the interior of the spray generating chamber 28. This effect is conducive to the formation of crema.

As becomes apparent from FIG. 6, each straight line 13 identified as the crown area of the dome 25 is in a 90° offset position relative to the preceding or following straight line 13 of a row 29, 30, as a result of which the apertures 22, 23 are equally offset from each other by 90° in alternating sequence. It will be understood, of course, that other angles may also be contemplated. In FIG. 6, the centers 31 of the circles 14 lie on rows 29, 30 extending vertically and horizontally to each other at equal relative distances y. This distance y is about 2.5 mm in the embodiment, while the diameters of the circles are about 1.6 mm. However, it will be appreciated that it is within the scope of the present invention to provide also other dimensions.

Figure 4:
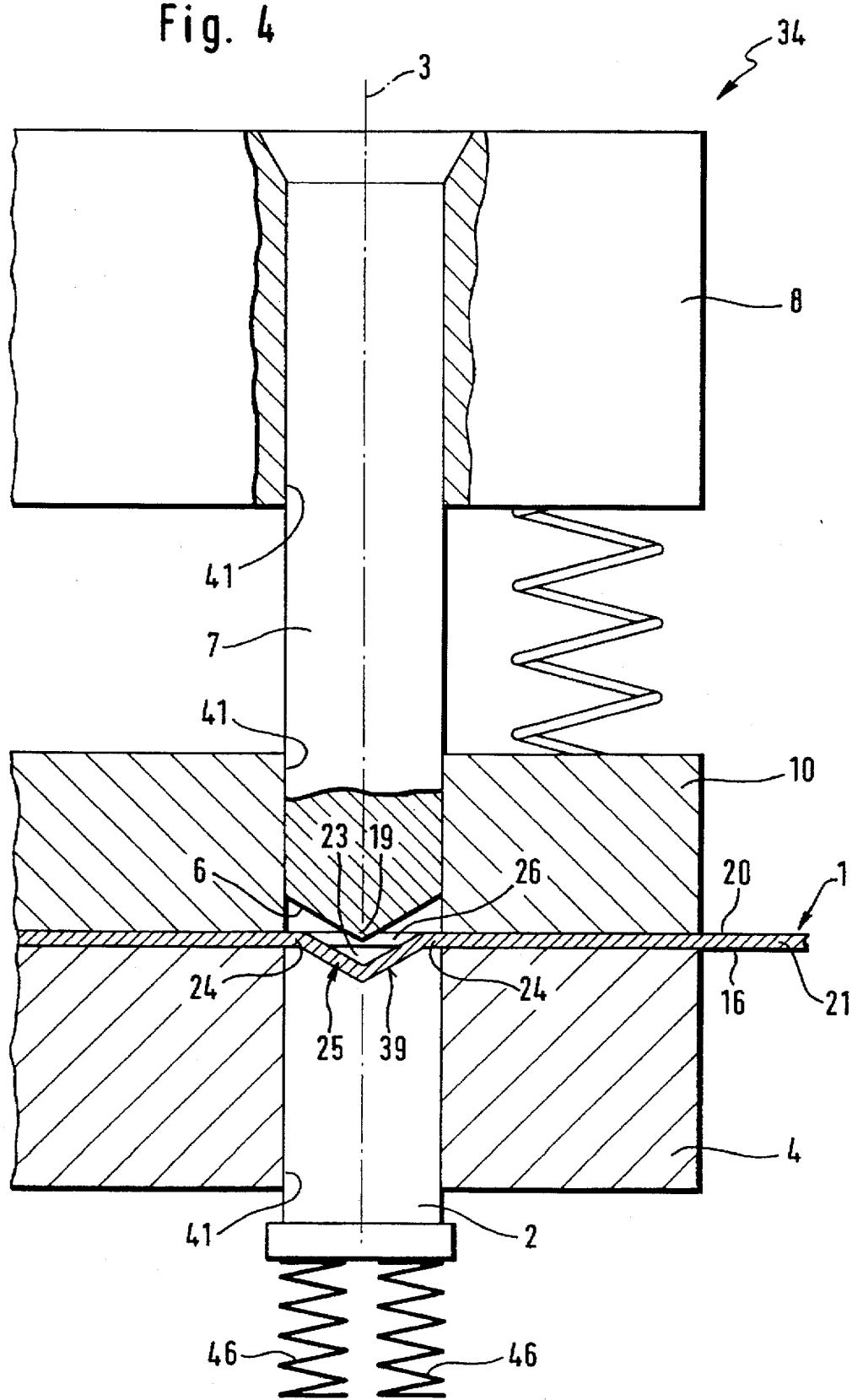
FIG. 4 is a schematic representation of a cutting die for manufacturing the filtering means of FIGS. 1 to 3.

To produce the domes 25 and the apertures 22, 23 in the disk structure 21, the cutting die 34 illustrated in FIG. 4 is suitable. It is comprised of a die steel 4, a punch guide 10 and an upper shoe 8 on which the punch steels 7 are axially slidable within bores 41. The cutting die 34 is equipped with punch steels 7 corresponding in number to the number of domes 25. The punch steels 7 are shaped in the manner of cylindrical pins with flatted sides (not shown because these lie in front of and behind the plane of the drawing) which serve to produce the flatted portions 5 in FIG. 3. To manufacture the filtering means 1 as shown in FIGS. 5 to 7, the punch steels are of a circular cylindrical configuration.

The punch steels 7 cooperate with the bores 41 in the punch guide 10 and the die steel 4 in a guiding relationship. The cutting edges 6 of the punch steels 7 lie in a plane inclined at a 45° angle relative to the longitudinal axis 3 of the punch steels 7 which is suitable to ensure that with the proper lancing depth of the punch steels 7 the disk structure 21 is only lance-cut, the resulting cut edges 27 being bent up to form the domes 25. In the process, the punch steels 7 urge the domes 25 into the recesses 39 of the lower punches 2, while the edges 24 are only slightly bent over the bending edge 15, as is clearly shown in FIGS. 2 and 7. The lower punches 2 serve the added function of knockouts in order to remove the disk structure 21 from the die steel 4 following a cutting operation. Strong springs 46 are arranged beneath the lower punches 2 to cushion the impact on the lower punches 2 during the punching operation.

To manufacture the filtering means of the present invention, stainless sheet steel may be used which is suitable for further processing to provide a cup-shaped structure for receiving espresso grounds, as shown in FIG. 5. In this method, the cup 12 with the disk structure 21 providing the bottom of the cup is first formed from flat strip stock by extrusion. Subsequently, the apertures 22, 23 are punched and the domes 25 as well as the edges 15 are produced by bending and embossing. These processes are performed in a single operation because the punch steel of FIG. 4 provides with the cutting edges 6 a suitable elevation 19 corresponding to the dome 25 in the filtering means 1.

Because the disk structure 21 of FIG. 4 is held tight against the die steel 4 and the punch guide 10 in the area of its edges 15 outside the domes 25, this area is prevented from being deformed outside the edges 15, that is, each punch steel 7 cuts the edges 26 and 27 and causes them to engage the recess 39 provided in the lower punch 2. In the punching operation, a burr is produced at the cut edges 35, 36 and 37, 38 which enhances the formation of crema. After manufacture of all of the two hundred apertures for a filtering means 1 with a capacity of, for example, one to two cups, that is, one hundred domes 25 accordingly involving one hundred punches 7 and 2, the members 10, 4 of the cutting die 34 are separated from each other to allow the removal of the filtering means 1 or the cup 12 of FIG. 5 from the cutting die 34. The apertures 22, 23 are thus manufactured in an extremely simple and low-cost manner within a minimum of time and without involving a process in which scrap slug is produced.

The punching operation produces extremely sharp cut edges 35, 36, 37, 38 around the apertures, with the outward facing edges 32, 33 of each dome 25 extending in a rounded configuration as results from punching. The risk of injury when touching the surface 20 of the disk structure 21 is thus avoided. In a two-cup capacity filter basket 12, the filtering means 1 has about 200 apertures, while a four-cup capacity filter basket has a filtering means with about 400 apertures 22, 23.

In the preparation of an espresso beverage, the brewing chamber 11 illustrated in FIG. 5 is first filled with espresso grinds. Then the cup 12 is closed tight from above by means of a piston of an espresso maker (not shown), and hot water is admitted into the brewing chamber 11 through the piston. As this occurs, the water is forced through the espresso grinds under the pressure acting from above, the grinds are extracted, and the resulting brew 59, arriving from the afflux side 17, is discharged in the direction of flow 40 through the apertures 22,23 of the disk structure 21 to the efflux side 18. As the water is forced through the grinds and then through the apertures 22, 23, the cross-sections of the apertures 22, 23 are maintained unchanged, so that a maximum possible pressure drop is accomplished at the outlet of the filtering means, producing good crema.

The filtering means 1 described is in particular suitable for the filtration of hot extraction beverages such as tea or coffee, in particular however espresso. The filtering means 1 has the advantage that it affords ease and economy of manufacture, and that the very small cross-sections of the apertures 22, 23 can be maintained within very close tolerances.

We claim:

1. A filter for filtration of extraction beverages, comprising:
    a disk with a plurality of openings through which a brew extracted from a material to be extracted passes from an afflux side to an efflux side of the disk,
    said disk including a plurality of deformed regions extending away from a surface of the disk, each said plurality of deformed regions forming a roof-shaped dome spanning a corresponding one of said plurality of openings, each of said plurality of roof shaped domes defining a first aperture in fluid communication with said one of said plurality of openings, said first aperture sized with an area of about 0.045 mm$^2$ to 0.125 mm$^2$ to cause a pressure drop as the brew passes therethrough.

2. The filter of claim 1 wherein each of said plurality of domes defines a second aperture aligned with said first aperture such that jets of brew exiting form the first aperture and from the second aperture impinge upon each other.

3. The filter of claim 2 wherein said second aperture is sized to cause a pressure drop as the brew passes therethrough.

4. The filter of claim 2 wherein said first aperture and said second aperture are positioned opposite each other.

5. The filter of claim 4 wherein the jets impinge upon each other form opposite directions.

6. The filter of claim 2 wherein said dome defines a spray generating chamber located between the first aperture and the second aperture in which the jets impinge upon each other to create crema.

7. The filter of claim 1 wherein said plurality of domes extend from the surface of the disk toward the afflux side of the disk.

8. The filter of claim 1 wherein said plurality of domes comprises a roofed-shape bridge having first and second portions descending from a central, crown area toward the surface of the disk.

9. The filter of claim 8 wherein said central, crown area lies on a straight line.

10. The filter of claim 9 wherein said plurality of domes are arranged in rows on the disk and the straight lines of the domes of a row extend vertically and horizontally to each other in alternating sequence.

11. The filter of claim 1 wherein said first aperture comprises a triangular cross-section.

12. The filter of claim 11 wherein said first aperture has of a height between about 0.15 mm and 0.25 mm.

13. The filter of claim 12 wherein said first aperture has a height of 0.21 mm+/−0.03 mm.

14. The filter of claim 11 wherein said first aperture has a height between about 0.12 mm and 0.21 mm.

15. The filter of claim 14 wherein said first aperture has a height of 0.18 mm+/−0.03 mm.

16. The filter of claim 11 wherein the triangles are right triangles.

17. The filter of claim 1 wherein said plurality of domes are formed by bending a cut edge of the disk away from the surface of the disk.

18. The filter of claim 17 wherein the cut edge has a contour of a straight line.

19. The filter of claim 17 wherein the cut edge has a contour of a curved line.

20. The filter of claim 2 wherein each of said plurality of domes is formed by bending a first cut edge and a second cut edge of the disk away from the surface of the disk.

21. The filter of claim 20 wherein said first cut edge and said second cut edge lie on a common circle.

22. The filter of claim 21 wherein the common circle has a diameter of between about 1 mm and 3 mm.

23. The filter of claim 22 wherein the diameter is 1.6 mm.

24. The filter of claim 21 wherein said plurality of domes are arranged in rows on the disk and the centers of each of the common circles are spaced between about 2 mm and 4 mm.

25. The filter of claim 24 wherein the centers are spaced at 2.5 mm.

26. The filter of claim 21 wherein bend radii produced on the disk during forming of said plurality of domes lie on the common circle.

27. The filter of claim 1 wherein said aperture is produced by a punching process.

28. The filter of claim 27 where said dome is formed simultaneously with said aperture during the punching process.

29. A filter cup, comprising:
a cup for holding extraction material, a base of the cup being in the form of the filter for filtration of extraction beverages, said filter including
a disk with a plurality of openings through which a brew extracted from a material to be extracted passes from an afflux side to an efflux side of the disk,
said disk including a plurality of deformed regions extending away from a surface of the disk, each said plurality of deformed regions forming a roof-shaped dome spanning a corresponding one of said plurality of openings, each of said plurality of roof shaped domes defining a first aperture in fluid communication with said one of said plurality of openings, said first aperture sized to cause a pressure drop as the brew passes therethrough.

* * * * *